(12) United States Patent
Shi et al.

(10) Patent No.: US 12,538,384 B2
(45) Date of Patent: Jan. 27, 2026

(54) WIRELESS COMMUNICATION METHOD, APPARATUS, AND SYSTEM

(71) Applicant: HUAWEI TECHNOLOGIES CO., LTD., Shenzhen (CN)

(72) Inventors: Xiaoli Shi, Shanghai (CN); Wenjie Peng, Shanghai (CN); Mingzeng Dai, Shenzehen (CN); Jun Wang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 492 days.

(21) Appl. No.: 17/809,784

(22) Filed: Jun. 29, 2022

(65) Prior Publication Data

US 2022/0330371 A1    Oct. 13, 2022

Related U.S. Application Data

(63) Continuation of application No. PCT/CN2019/129738, filed on Dec. 30, 2019.

(51) Int. Cl.
| | |
|---|---|
| *H04W 92/18* | (2009.01) |
| *H04W 4/40* | (2018.01) |
| *H04W 72/542* | (2023.01) |
| *H04W 76/14* | (2018.01) |
| *H04W 76/18* | (2018.01) |

(52) U.S. Cl.
CPC ............ *H04W 92/18* (2013.01); *H04W 4/40* (2018.02); *H04W 72/542* (2023.01); *H04W 76/14* (2018.02); *H04W 76/18* (2018.02)

(58) Field of Classification Search
CPC ..... H04W 92/18; H04W 4/40; H04W 72/542; H04W 76/14; H04W 76/18; H04W 76/27; H04W 76/19; H04L 41/0686; H04L 43/0811; H04L 69/40
See application file for complete search history.

(56) References Cited

U.S. PATENT DOCUMENTS

| | | | |
|---|---|---|---|
| 2014/0133465 A1 | 5/2014 | Johansson et al. | |
| 2014/0235271 A1 | 8/2014 | Jung et al. | |
| 2019/0149365 A1 | 5/2019 | Chatterjee et al. | |
| 2020/0037354 A1* | 1/2020 | Li | H04W 74/0808 |

(Continued)

FOREIGN PATENT DOCUMENTS

| | | |
|---|---|---|
| CN | 108307409 A | 7/2018 |
| EP | 2874428 A1 | 5/2015 |
| EP | 3611966 A1 | 2/2020 |

(Continued)

OTHER PUBLICATIONS

Ericsson (Rapporteur), Summary of email discussion [107#75][NR/V2X] RLF. 3GPP TSG-RAN WG2 #107bis, Chongqing, China, Oct. 14-18, 2019, R2-1913328, 26 pages.

(Continued)

*Primary Examiner* — Ayanah S George
(74) *Attorney, Agent, or Firm* — HAUPTMAN HAM, LLP

(57) ABSTRACT

A method for processing radio link failure (RLF) information includes obtaining sidelink (SL) RLF information of an SL on which an RLF occurs and a terminal device is in an idle state or an inactive state. The further includes determining that the terminal device is in a connected state, and sending the SL RLF information to a network device.

20 Claims, 7 Drawing Sheets

(56) References Cited

U.S. PATENT DOCUMENTS

2022/0150730 A1* 5/2022 Freda .................... H04W 24/04
2023/0010625 A1* 1/2023 Xu ........................ H04W 24/10

FOREIGN PATENT DOCUMENTS

WO     WO-2019245352 A1 * 12/2019 ............ H04W 24/10
WO     WO-2019245353 A1 * 12/2019 ............. C12N 15/10

OTHER PUBLICATIONS

3GPP TS 38.331 V15.8.0 (Dec. 2019), 3rd Generation Partnership Project; Technical Specification Group Radio Access Network; NR; Radio Resource Control (RRC) protocol specification(Release 15), 532 pages.
Partial Supplementary European Search Report issued in corresponding European Application No. 19958670.2, dated Dec. 8, 2022, pp. 1-18.
OPPO, Left issues on failure case handling for NR V2X. 3GPP TSG-RAN WG2 Meeting #108, Reno, US, Nov. 18-Nov. 22, 2019, R2-1914466, 5 pages.
CATT, RLM / RLF Procedure in NR V2X Sidelink. 3GPP TSG-RAN WG2 Meeting #108, Reno, USA, Nov. 18-22, 2019, R2-1914441, 6 pages.
International Search Report issued in corresponding International Application No. PCT/CN2019/129738, dated Oct. 10, 2020, pp. 1-8.
European Office Action issued in EP19958670.2 dated Aug. 8, 2025.

* cited by examiner

WIRELESS COMMUNICATION METHOD, APPARATUS, AND SYSTEM

CROSS-REFERENCE TO RELATED APPLICATIONS

This application is a continuation of International Application No. PCT/CN2019/129738, filed on Dec. 30, 2019, the disclosure of which is hereby incorporated by reference in its entirety.

TECHNICAL FIELD

This application relates to the communication field, and in particular, to a wireless communication method, an apparatus, and a system.

BACKGROUND

Vehicle to everything (vehicle to everything, V2X) refers to interconnection and information exchange between a vehicle and the outside by using an apparatus (such as a sensor or an in-vehicle terminal) configured on the vehicle and various communication technologies, as shown in FIG. 1. A V2X service may include interconnection communication of vehicle to vehicle (vehicle to vehicle, V2V), vehicle to pedestrian (vehicle to pedestrian, V2P), vehicle to infrastructure (vehicle to infrastructure, V2I), vehicle to network (vehicle to network, V2N), and vehicle to grid (vehicle to grid, V2G), and the like, which may be used in fields such as car sharing (car sharing) and intelligent network driving (intelligent network driving, IND)

As shown in FIG. 2, a V2X service may be provided in two manners: a PC5 interface and a Uu interface. The Uu interface refers to a communication interface between a terminal device and a network device. The PC5 interface is configured to transmit Proximity-based Services for direct communication or discovery between terminal devices through a sidelink (sidelink, SL). Signaling and data transmission may be directly performed between V2X terminal devices through the interface. The sidelink may be considered as a radio link between the PC5 interfaces. The PC5 interface may be used out of coverage (out of coverage, OOC) and in coverage (in coverage, IC) of a wireless network, but only an authorized V2X device can use the PC5 interface for transmission.

The network device may allocate, to the V2X device, a PC5 interface resource used for SL communication. After establishing the SL, the V2X device may perform broadcast, unicast, and multicast communication on the sidelink.

The SL may be considered as a radio link in the PC5 interface. When an SL radio link failure RLF occurs, the terminal devices fail to communicate with each other properly. Consequently, utilization of the V2X service in a wireless communication system is affected.

SUMMARY

Embodiments of this application provide a method, an apparatus, and a system for processing an RLF information, to help a network device obtain the RLF information of an SL in a wireless communication system, so that an RLF problem can be located, and an RLM function can be complete. Further, the network device may optimize a resource of the SL based on the obtained SL RLF information or RLM information. This may reduce RLFs caused by resource configuration, and improve a success rate of SL communication.

According to a first aspect, a method for processing SL RLF information is provided, which may be applied to a terminal device. The method includes obtaining SL RLF information of an SL when a terminal device is in an idle state or an inactive state; determining that the terminal device is in a connected state; and sending the SL RLF information to a network device.

In a possible implementation, when a connection between the terminal device and the network device is successfully established, the terminal device may report SL RLF information recorded in an idle state or an inactive state to the network device.

In another possible implementation, based on a report periodicity or a report condition that is of the SL RLF information and that is configured by the network device, when the report periodicity of the SL RLF information is reached or the report condition is met, the terminal device may send the SL RLF information to the network device. The report periodicity or the report condition of the SL RLF information may be configured by the network device by using a system message or a report request message.

In still another possible implementation, the terminal device sends an SL RLF information availability indication to the network device, so that the network device may determine whether the SL RLF information is available and whether to request the SL RLF information.

Based on the foregoing method, after the terminal device is restored to the connected state, the terminal device may report, to the network device, the SL RLF information that occurs when the terminal device is in an idle state or an inactive state, so that the network device may more comprehensively obtain RLF information of the SL to locate an RLF problem, and a radio link management RLM function of the SL is more complete.

According to a second aspect, a method for processing SL RLF information is provided, which may be applied to a network device. The method includes receiving SL RLF information of a sidelink SL of a terminal device on which an RLF occurs when the terminal device is in an idle state or an inactive state; and processing configuration related to the SL based on the SL RLF information.

In a possible implementation, the network device may send an RLF request to the terminal device, so that the terminal device reports the SL RLF information, where an SL RLF request may request the terminal device to immediately report the SL RLF information, may include report types of the terminal device, for example, a transmit-end terminal device or a receive-end terminal device, and may further include a report periodicity or a report condition of the SL RLF information.

In another possible implementation, the network device may receive an SL RLF availability indication of the terminal device, and based on the RLF availability indication, determine whether to request the terminal device to report the SL RLF information.

In still another possible implementation, the processing configuration related to the SL based on the SL RLF information by the network device includes optimizing an SL-related resource or a transmission configuration parameter of a PC5 interface based on the SL RLF information.

In still another possible implementation, the processing configuration related to the SL based on the SL RLF information by the network device includes determining a network device corresponding to an SL RLF, and sending the SL RLF information to the network device corresponding to the SL RLF, to enable the network device to process the configuration related to the SL. Therefore, SL resource configuration is optimized more accurately.

In the foregoing solution, the network device may obtain the SL RLF information that occurs when the terminal device is in an idle state or an inactive state, to complete an RLM function. Root cause analysis is performed, to optimize and process the SL resource configuration, and reduce RLFs.

In the first aspect or the second aspect or any one of the possible implementations of the first aspect and the second aspect:

The terminal device may be a transmit-end terminal device, or may be a receive-end terminal device.

The SL RLF information may include one or more of the following: cell information of the SL RLF, zone (zone) information of the SL RLF, frequency information of the SL, or resource information of the SL.

In the preceding information:

The cell information may include one or more of the following: a cell identifier, a physical cell identifier, and a cell global identifier. The zone (zone) information may include a zone identifier. The frequency information may include one or more of the following: a frequency band, or a frequency band identifier, a frequency, or a bandwidth part (bandwidthpart, BWP) identifier, or the like. The resource information may include one or more of the following: a resource type, or a frequency domain parameter or a time domain parameter of a resource, or the like.

The resource type includes an exceptional (exceptional) resource, a common (common) resource, or a dedicated resource.

Optionally, the SL RLF information may include an RLF type, to distinguish whether an RLF is caused by an AS stratum configuration failure. For example, the SL RLF information may be an SL RLF or an AS stratum configuration failure. If the RLF type is an SL RLF, the SL RLF information may further include an RLF cause, for example, a quantity of RLC retransmissions reaching the maximum, an integrity protection failure, or out-of-synchronization.

Optionally, the SL RLF information may further include a channel busy ratio of the SL.

Optionally, the SL RLF information may further include a source identifier (sourceID) and a destination identifier (destinationID).

Optionally, the SL RLF information may further include location information of the transmit-end terminal device and/or location information of the receive-end terminal device.

In still another possible implementation, the terminal device may record the SL RLF information in a log manner.

In still another possible implementation, the SL RLF information sent by the terminal device to the network device may be reported by using an existing RRC message, or may be reported by using a newly defined message.

According to a third aspect, a method for processing SL RLF information is provided. The method includes: sending access AS stratum configuration information, to configure an AS stratum of a receive-end terminal device; receiving a configuration response message of the access AS stratum configuration information, where the configuration response message includes an AS stratum configuration failure indication of a PC5 interface or an AS stratum configuration completion indication of a PC5 interface; and sending AS stratum configuration completion information to a network device based on the configuration response message.

The AS stratum configuration information may be obtained by the transmit-end terminal device from the network device, or may be generated by the transmit-end terminal device itself, or may be generated by the transmit-end device based on a PC5 interface resource of broadcast configuration or RRC configuration of the network device.

In the foregoing solution, the transmit-end terminal device may report, to the network device, information about a configuration result indicating that the receive-end terminal device fails to be configured in a connected state, so that the network device may more comprehensively obtain AS stratum configuration information of the PC5 interface, and a radio link management RLM function of the SL is more complete.

According to a fourth aspect, a method for processing SL RLF information is provided. The method includes:

receiving AS stratum configuration information sent by the transmit-end terminal device; configuring an AS stratum based on the AS stratum configuration information; and sending a configuration response message to the transmit-end terminal device, where the configuration response message includes a configuration result.

According to a fifth aspect, a method for processing SL RLF information is provided. The method includes:

receiving AS stratum configuration completion information sent by the terminal device; and processing configuration related to the SL based on the received AS stratum configuration completion information.

In the foregoing solution, the network device may obtain the SL RLF information that occurs when the terminal device is in an idle state or an inactive state, to complete an RLM function. Root cause analysis is performed, to optimize and process the SL resource configuration, and reduce RLFs.

In the third aspect to the fifth aspect or any one of the possible implementations of the third aspect to the fifth aspect, optionally, the AS stratum configuration may include unicast connection transmission configuration of the transmit-end terminal device and the receive-end terminal device, or multicast connection transmission configuration of the transmit-end terminal device and the receive-end terminal device.

According to a sixth aspect, a method for processing SL RLM information is provided, which may be applied to a terminal device. The method includes obtaining SL RLM information of an SL; and sending the SL RLM information to a network device.

In a possible implementation, before the terminal device sends the SL RLM information to the network device, it needs to determine that the terminal device is in a connected state.

In a possible implementation, when a connection between the terminal device and the network device is successfully established, the terminal device may report SL RLM information recorded in an idle state or an inactive state to the network device.

In another possible implementation, based on a report periodicity or a report condition that is of the SL RLM information and that is configured by the network device, when the report periodicity of the SL RLM information is reached or the report condition is met, the terminal device may send the SL RLM information to the network device. The report periodicity or the report condition of the SL RLM information may be configured by the network device by using a system message or a report request message.

In still another possible implementation, the terminal device sends an SL RLM information availability indication to the network device, so that the network device may determine whether the SL RLM information is available and whether to request the SL RLM information.

Based on the foregoing method, the terminal device may report the SL RLM information to the network device, so that the network device may more comprehensively obtain a radio link status and information of the SL, and a radio link management RLM function of the SL is more complete.

According to a seventh aspect, a method for processing SL RLM information is provided. The method includes receiving SL RLM information of a terminal device; and processing configuration related to the SL based on the SL RLM information.

In a possible implementation, the network device may send an RLM request to the terminal device, so that the terminal device reports the SL RLM information, where the SL RLM request may request the terminal device to immediately report the SL RLM information, may include report types of the terminal device, for example, a transmit-end terminal device or a receive-end terminal device, and may further include a report periodicity or a report condition of the SL RLM information.

In another possible implementation, the network device may receive an SL RLM availability indication of the terminal device, and based on the RLM availability indication, determine whether to request the terminal device to report the SL RLM information.

In still another possible implementation, the processing configuration related to the SL based on the SL RLM information by the network device includes optimizing an SL-related resource or a transmission configuration parameter of a PC5 interface based on the SL RLM information.

In still another possible implementation, the processing configuration related to the SL based on the SL RLM information by the network device includes determining a network device corresponding to an SL RLM, and sending the SL RLM information to the network device corresponding to the SL RLM, to enable the network device to process the configuration related to the SL. Therefore, SL resource configuration is optimized more accurately.

In the foregoing solution, the network device can obtain the SL RLM information of the terminal device, to complete an RLM function, optimize and process the SL resource configuration, and reduce RLFs.

In the sixth aspect or the seventh aspect or any one of the possible implementations of the sixth aspect or the seventh aspect:

The terminal device may be a transmit-end terminal device, such as Tx UE, or may be a receive-end terminal device, such as Rx UE.

The SL RLM information may include one or more of the following:

maximum quantity of consecutively received continuous "out-of-sync" indications; a radio link recovery timer; maximum quantity of continuous "in-sync" indications; maximum quantity of RLC retransmissions; indications of a channel quality synchronization threshold Qin and a channel quality out-of-synchronization threshold Qout; measurement reference signal strength RSRP, reference signal quality RSRQ, and signal to interference plus noise ratio of a cell; measurement reference signal strength RSRP, reference signal quality RSRQ, and signal to interference plus noise ratio of an SL.

Optionally, the SL RLM information may further include a source identifier (sourceID) and a destination identifier (destinationID), where the source and the destination are respectively a transmit-end terminal device and a receive-end terminal device.

According to an eighth aspect, a communication apparatus is provided. The communication apparatus includes a processing module and a transceiver module, where the processing module may receive or send a message by using the transceiver module. The processing module may be configured to perform the method in any one of the foregoing aspects and implementations. The communication apparatus may be the terminal device in any one of the foregoing aspects, for example, an in-vehicle communication apparatus, or an apparatus including the foregoing terminal device, for example, various types of vehicles, or an apparatus included in the foregoing terminal device, for example, a system chip. Alternatively, the communication apparatus may be the network device in any one of the foregoing aspects, or an apparatus included in the network device in any one of the foregoing aspects, for example, a system chip. The communication apparatus includes a corresponding module, unit, or means (means) for implementing the foregoing method. The module, unit, or means may be implemented by hardware or software, or implemented by hardware executing corresponding software. The hardware or software includes one or more modules or units corresponding to the foregoing functions.

According to a ninth aspect, a communication apparatus is provided. The communication apparatus includes a processor, and may further include a memory. The memory is configured to store computer instructions. When the processor executes the instructions, the communication apparatus is enabled to perform the method according to any one of the foregoing aspects. The communication apparatus may be the terminal device in any one of the foregoing aspects, for example, an in-vehicle communication apparatus, or an apparatus including the foregoing terminal device, for example, various types of vehicles, or an apparatus included in the foregoing terminal device, for example, a system chip. Alternatively, the communication apparatus may be the network device in any one of the foregoing aspects, or an apparatus included in the network device in any one of the foregoing aspects, for example, a system chip.

According to a tenth aspect, a communication apparatus is provided. The communication apparatus includes a processor. The processor is configured to: after being coupled to a memory and reading instructions in the memory, perform the method according to any one of the foregoing aspects based on the instructions. The communication apparatus may be the terminal device in any one of the foregoing aspects, for example, an in-vehicle communication apparatus, or an apparatus including the foregoing terminal device, for example, various types of vehicles, or an apparatus included in the foregoing terminal device, for example, a system chip. Alternatively, the communication apparatus may be the network device in any one of the foregoing aspects, or an apparatus included in the network device in any one of the foregoing aspects, for example, a system chip.

According to an eleventh aspect, a computer program product is provided. The computer program product includes a computer program (which may also be referred to as code or an instruction). When the computer program is run, the method in any possible implementation of any one of the foregoing aspects is performed.

According to a twelfth aspect, a computer-readable storage medium is provided. The computer-readable storage medium stores a computer program (which may also be referred to as code or an instruction). When the computer program is run on a computer, the computer is enabled to perform the method in any possible implementation of any one of the foregoing aspects.

According to a thirteenth aspect, a communication system is provided. The communication system includes the terminal device according to any one of the foregoing aspects and the network device according to any one of the foregoing aspects.

DESCRIPTION OF EMBODIMENTS

Figure 1:
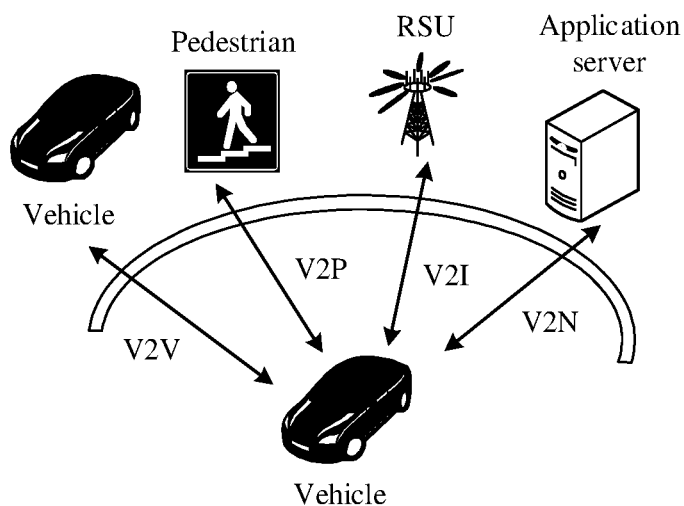
FIG. 1 is a schematic diagram of a V2X service in the conventional technology.

The following describes the technical solutions of this application with reference to the accompanying drawings.

In descriptions of this application, "/" represents an "or" relationship between associated objects unless otherwise specified. For example, A/B may represent A or B. In this application, "and/or" describes only an association relationship for describing associated objects and represents that three relationships may exist. For example, A and/or B may represent the following three cases: Only A exists, both A and B exist, and only B exists, where A and B may be singular or plural. In addition, in the descriptions of this application, "a plurality of" means two or more than two unless otherwise specified. In addition, "at least one of the following items (pieces)" or a similar expression thereof indicates any combination of these items, including a single item (piece) or any combination of a plurality of items (pieces). For example, at least one of a, b, or c may indicate: a, b, c, a and b, a and c, b and c, or a, b, and c, where a, b, and c may be singular or plural. In addition, to clearly describe the technical solutions in the embodiments of this application, in the embodiments of this application, terms such as "first" and "second" are used to distinguish between same objects or similar objects whose functions and purposes are basically the same. A person skilled in the art may understand that the terms such as "first" and "second" do not limit a quantity or an execution sequence, and the terms such as "first" and "second" do not indicate a definite difference.

The technical solutions in the embodiments of this application may be applied to various communication systems, such as an orthogonal frequency-division multiple access (orthogonal frequency-division multiple access, OFDMA) system, a single carrier frequency-division multiple access (single carrier FDMA, SC-FDMA) system, and other systems. The terms "system" and "network" can be interchanged with each other. The OFDMA system may implement wireless technologies such as evolved universal terrestrial radio access (evolved universal terrestrial radio access, E-UTRA) and ultra mobile broadband (ultra mobile broadband, UMB). The E-UTRA is an evolved release of a universal mobile telecommunications system (universal mobile telecommunications system, UMTS). The 3rd generation partnership project (3rd generation partnership project, 3GPP) uses a new release of the E-UTRA in LTE and various releases evolved based on LTE. A 5G communication system is a next-generation communication system under research, and may also be referred to as an NR system. The 5G communication system includes a non-standalone (non-standalone, NSA for short) 5G mobile communication system, a standalone (standalone, SA for short) 5G mobile communication system, or both an NSA 5G mobile communication system and an SA 5G mobile communication system. In addition, the communication systems may be further applied to a future-oriented communication technology, and are all applicable to the technical solutions provided in embodiments of this application. The foregoing communication systems applicable to this application are merely examples for description, and communication systems applicable to this application are not limited thereto. A general description is provided herein, and details are not described below.

All aspects, embodiments, or features are presented in this application by describing a system that may include a plurality of devices, components, modules, and the like. It should be appreciated and understood that, each system may include another device, component, module, and the like, and/or may not include all devices, components, modules, and the like discussed with reference to the accompanying drawings. In addition, a combination of these solutions may be used.

A network architecture and a service scenario described in the embodiments of this application are intended to describe the technical solutions in the embodiments of this application more clearly, and do not constitute a limitation on the technical solutions provided in the embodiments of this application. A person of ordinary skill in the art may know that with evolution of the network architecture and emergence of a new service scenario, the technical solutions provided in the embodiments of this application are also applicable to a similar technical problem.

Figure 2:
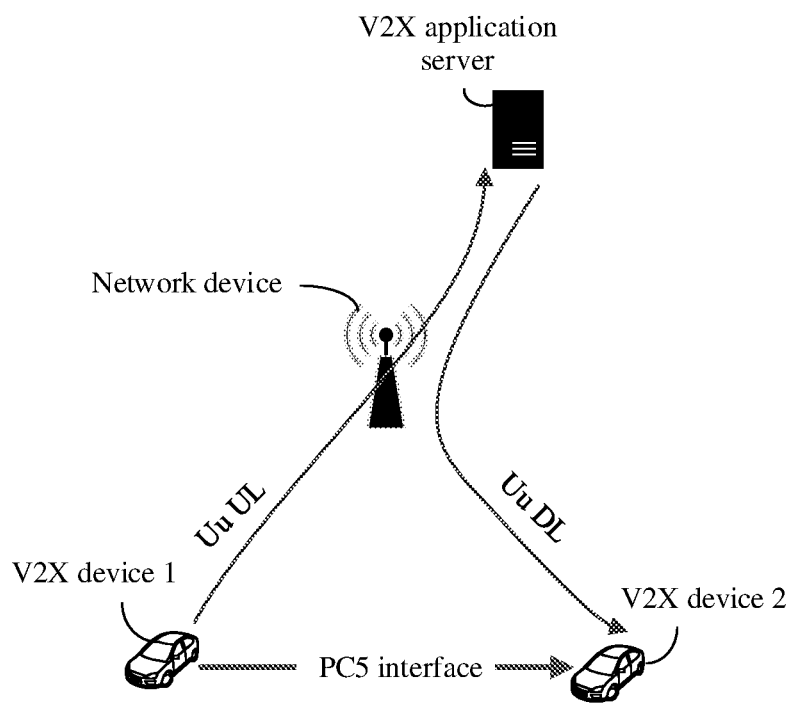
FIG. 2 is a schematic diagram of an application scenario according to an embodiment of this application.

Some scenarios in the embodiments of this application are described by using a scenario in a communication system shown in FIG. 2 as an example. It should be noted that, the solutions in the embodiments of this application may also be applied to another communication system, and a corresponding name may also be replaced with a name of a corresponding function in the another communication system.

For ease of understanding of the embodiments of this application, a communication system shown in FIG. 2 is first used as an example to describe in detail a communication system to which the embodiments of this application are applicable. FIG. 2 is a schematic diagram of an architecture of a communication system to which a communication method according to an embodiment of this application is applicable. As shown in FIG. 2, the communication system includes one or more terminal devices such as a V2X device 1 and a V2X device 2, and one or more network devices. The terminal devices may communicate with each other through a PC5 interface (in FIG. 2, for example, only one terminal device, the V2X device 1, communicates with another terminal device, the V2X device 2). The PC5 interface is a direct communication interface between the terminal devices, and a communication link for direct connection between the terminal devices is referred to as a side link or a sidelink (sidelink, SL). Certainly, the terminal devices may further communicate with each other through a Uu interface. Uu interface communication means that V2X data is sent by a transmit terminal device, the V2X device 1, to a network device through the Uu interface, and that the V2X data is sent by the network device to a V2X application server for processing, and then delivered by the V2X application server to the network device and sent by the network device to a receive terminal device, the V2X device 2.

It should be noted that, the terminal device in this embodiment of this application may be a vehicle (vehicle), or may be an in-vehicle terminal that is mounted on a vehicle and that is configured to assist the vehicle in driving, or a chip in the in-vehicle terminal. The in-vehicle terminal may be user equipment (user equipment, UE), an access terminal, a terminal unit, a terminal station, a mobile station, a mobile console, a remote station, a remote terminal, a mobile device, a wireless communication device, a terminal agent, a terminal apparatus, or the like in a 5G network or a future evolved PLMN. The access terminal may be a cellular phone, a cordless phone, a session initiation protocol (session initiation protocol, SIP) phone, a wireless local loop (wireless local loop, WLL) station, a personal digital assistant (personal digital assistant, PDA), a handheld device having a wireless communication function, a computing device, another processing device connected to a wireless modem, an in-vehicle device, a wearable device, a virtual reality (virtual reality, VR) terminal device, an augmented reality (augmented reality, AR) terminal device, a wireless terminal in industrial control (industrial control), a wireless terminal in self-driving (self-driving), a wireless terminal in remote medical (remote medical), a wireless terminal in a smart grid (smart grid), a wireless terminal in transportation safety (transportation safety), a wireless terminal in a smart city (smart city), a wireless terminal in a smart home (smart home), or the like. The in-vehicle terminal may be movable or fixed.

The network device in this embodiment of this application is a device that connects the terminal device 20 to a wireless network, and may be an evolved NodeB (evolutional Node B, eNB or eNodeB) in long term evolution (long term evolution, LTE), a base station in a 5th generation (5th generation, 5G) network or a future evolved public land mobile network (public land mobile network, PLMN), a broadband network gateway (broadband network gateway, BNG), an aggregation switch or a non-third generation partnership project (3rd generation partnership project, 3GPP) access device, or the like. This is not specifically limited in this embodiment of this application. Optionally, the base station in this embodiment of this application may include base stations in various forms, for example, a macro base station, a micro base station (which is also referred to as a small cell), a relay station, and an access point. This is not specifically limited in this embodiment of this application.

Optionally, the terminal device or the network device in this embodiment of this application may also be referred to as a communication apparatus or a communication device, and may be a general-purpose device or a dedicated device. This is not specifically limited in this embodiment of this application.

Figure 3:
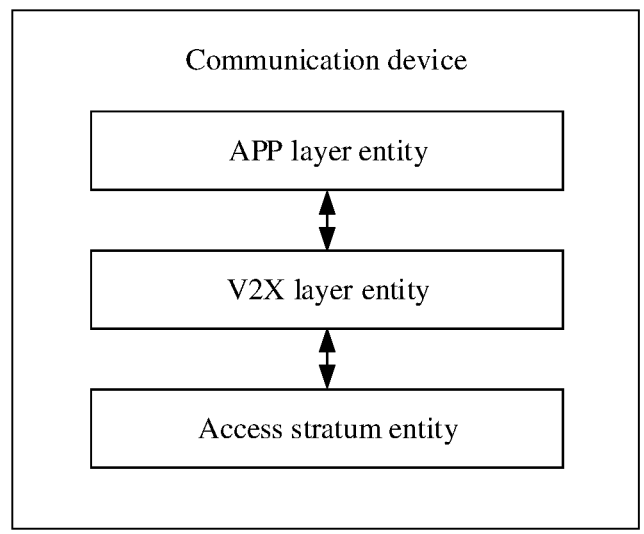
FIG. 3 is a schematic diagram of a structure of a communication device according to an embodiment of this application.

In a possible design, FIG. 3 is a schematic diagram of an architecture of a communication device configured to implement a V2X service. The communication device may be a terminal device, or may be a network device. An access stratum entity, a V2X layer entity, and an application layer (application, APP) entity are included. The access stratum entity, the V2X layer entity, and the APP layer entity may be understood as division of the communication device from a perspective of logical functions, and are respectively configured to implement functions of the access stratum, the V2X layer, and the APP layer. The entity in this application may be a physical entity, or may be a functional entity. For example, the access stratum entity, the V2X layer entity, and the APP layer entity may be understood as devices or physical entities in devices, or may be functional entities. This is not specifically limited in this embodiment of this application. The access stratum entity, the V2X layer entity, and the APP layer entity may be physically separated, or may be deployed together. The access stratum entity may be divided based on protocol layers of a wireless network. For example, functions of the following are set in the access stratum entity: a radio resource control (radio resource control, RRC) protocol layer, a packet data convergence protocol (packet data convergence protocol, PDCP) protocol layer, a radio link control (radio link control, RLC) protocol layer, a media access control (media access control, MAC) protocol layer, a physical (physical, PHY) protocol layer, and the like. It may be understood that, division of processing functions of the access stratum entity based on the protocol layers is merely an example, and the processing functions of the access stratum entity may alternatively be divided in another manner.

Figure 4:
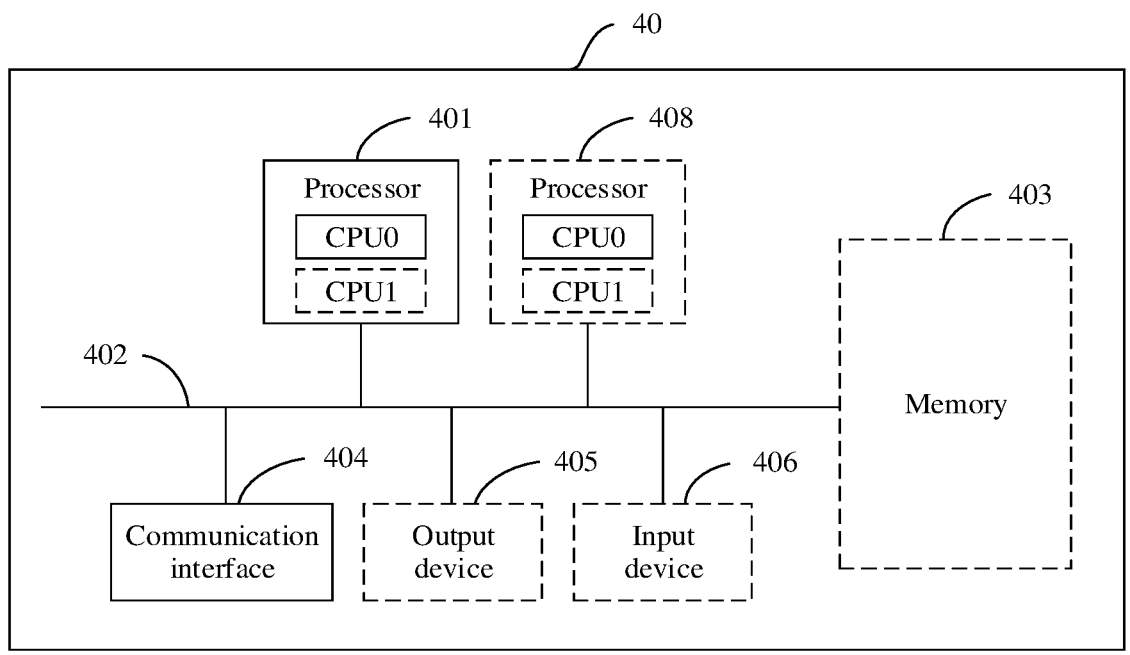
FIG. 4 is a schematic diagram of a structure of a communication device according to an embodiment of this application.

In a possible design, FIG. 4 is a schematic diagram of a structure configured to implement the communication device shown in FIG. 3. The communication device 40 includes one or more processors 401, a communication bus 402, and at least one communication interface (where in FIG. 4, an example in which a communication interface 404 and one processor 401 are included is merely used for description), and optionally, may further include a memory 403.

The processor 401 may be a general-purpose central processing unit (central processing unit, CPU), a microprocessor, an application-specific integrated circuit (application-specific integrated circuit, for implementation), or one or more integrated circuits configured to control program execution of the solutions in this application.

The communication bus 402 may be a peripheral component interconnect (peripheral component interconnect, PCI) bus, an extended industry standard architecture (extended industry standard architecture, EISA) bus, or the like. The bus may be classified into an address bus, a data bus, a control bus, and the like. For ease of representation, only one thick line is used to represent the bus in FIG. 4, but this does not mean that there is only one bus or only one type of bus. The communication bus 402 is configured to connect different components in the communication device 40, to enable the different components to communicate with each other.

The communication interface 404 may be a transceiver module configured to communicate with another device or a communication network, for example, the Ethernet, a radio access network (radio access network, RAN), or a wireless local area network (wireless local area network, WLAN. For example, the transceiver module may be an apparatus such as a transceiver or a transceiver machine. Optionally, the communication interface 404 may alternatively be a transceiver circuit located in the processor 401, and is configured to implement signal input and signal output of the processor.

The memory 403 may be an apparatus having a storage function. For example, the memory 403 may be a read-only memory (read-only memory, ROM) or another type of static storage device that can store static information and instructions, a random access memory (random access memory, RAM) or another type of dynamic storage device that can store information and instructions, an electrically erasable programmable read-only memory (electrically erasable programmable read-only memory, EEPROM), a compact disc read-only memory (compact disc read-only memory, CD-ROM) or another compact disc storage, optical disc storage (including a compressed optical disc, a laser disc, an optical disc, a digital versatile disc, a blue-ray optical disc, and the like), a magnetic disk storage medium or another magnetic storage device, or any other medium that can be configured to carry or store expected program code in a form of instructions or a data structure and that can be accessed by a computer. However, the memory 403 is not limited thereto. The memory may exist independently, and is connected to the processor through the communication bus 402. The memory may also be integrated with the processor.

The memory 403 is configured to store computer-executable instructions for executing the solutions in this application, and the processor 401 controls the execution. The processor 401 is configured to execute the computer-executable instructions stored in the memory 403, to implement a resource configuration method provided in the embodiments of this application.

Alternatively, optionally, in this embodiment of this application, the processor 401 may perform processing-related functions in the resource configuration method provided in the following embodiments of this application. The communication interface 404 is responsible for communicating with another device or another communication network. This is not specifically limited in this embodiment of this application.

Optionally, the computer-executable instruction in this embodiment of this application may also be referred to as an application program code. This is not specifically limited in this embodiment of this application.

In a specific implementation, in an embodiment, the processor 401 may include one or more CPUs, for example, a CPU 0 and a CPU 1 in FIG. 4.

In a specific implementation, in an embodiment, the communication device 40 may include a plurality of processors, for example, the processor 401 and a processor 408 in FIG. 4. Each of these processors may be a single-core (single-CPU) processor, or may be a multi-core (multi-CPU) processor. The processor herein may be one or more devices, circuits, and/or processing cores configured to process data (for example, a computer program instruction).

In a specific implementation, in an embodiment, the communication device 40 further includes an output device 405 and an input device 406. The output device 405 communicates with the processor 401, and may display information in a plurality of manners. For example, the output device 405 may be a liquid crystal display (liquid crystal display, LCD), a light emitting diode (light emitting diode, LED) display device, a cathode ray tube (cathode ray tube, CRT) display device, a projector (projector), or the like. The input device 306 communicates with the processor 301, and may receive an input from a user in a plurality of manners. For example, the input device 306 may be a mouse, a keyboard, a touchscreen device, or a sensor device.

It should be noted that, names of messages between devices, names of parameters in the messages, or the like in the following embodiments of this application are merely examples, and the messages or the parameters may have other names in specific implementations. This is not specifically limited in embodiments of this application.

When the terminal device is in an idle state, an inactive state, or a connected state in a wireless communication system, the terminal device may perform SL communication with another terminal device. It should be noted that, the idle state, the inactive state, and the connected state in the embodiments of this application are RRC connection states between the terminal device and the network device. When no RRC connection is established between the terminal device and the network device, the terminal device is in an idle state (RRC_IDLE). When an RRC connection is established between the terminal device and the network device, the terminal device is either in an inactive state (RRC_INACTIVE) or in a connected state (RRC_CONNECTED). Similar to the idle state, when the terminal device is in the inactive state, the terminal device can receive only paging or broadcast, or can perform measurement and reselection, and can move in a radio access network (radio access network, RAN) notification area (RAN-basednotification area, RNA). Usually, the network device indicates, by using an RRC release message, a suspend notification notifying that the terminal device in the connected state enters the inactive state. When the terminal device is in the inactive state, if the terminal device needs to send uplink signaling to the network device or receive downlink data from the network device, the terminal device is restored to the connected state. When the terminal device is in the connected state, signaling or data interactive transmission is performed between the terminal device and the network device.

Figure 5:
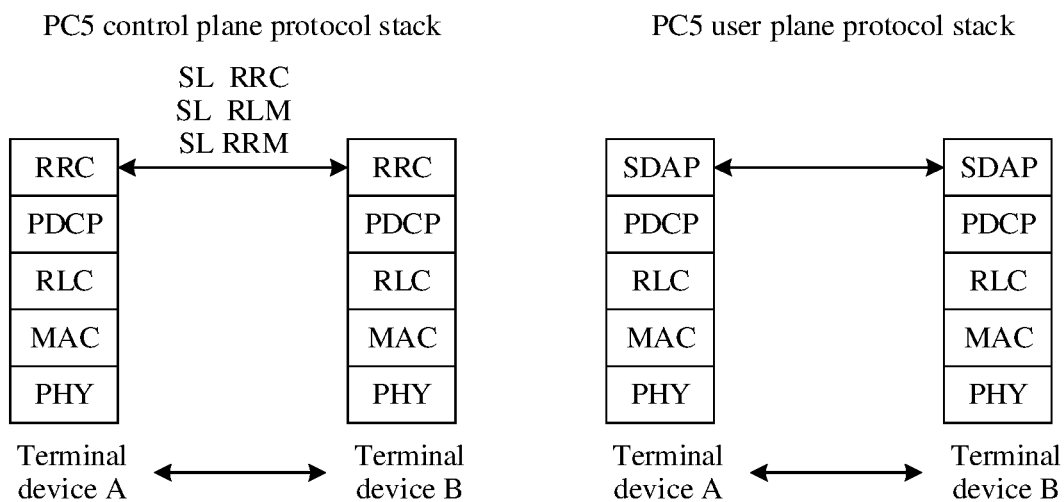
FIG. 5 is a schematic diagram of a control plane protocol stack and a user plane protocol stack of an SL PC5 interface.

The terminal devices use a PC5 interface to perform SL communication, and a resource required by the terminal devices may be configured by the network device. FIG. 5 is an example of an access stratum (access stratum, AS) control plane protocol stack and a user plane protocol stack of a PC5 interface. The control plane protocol stack may include a physical (PHY) layer, a media access control (MAC) layer, a radio link control (RLC) layer, a packet data convergence protocol (PDCP) layer, and a radio resource control (RRC) layer. Control plane functions between the terminal devices A and B may include SL RRC, SL radio link management (RLM), and SL radio resource management (RRM). The user plane protocol stack may include a physical (PHY) layer, a media access control (MAC) layer, a radio link control (RLC) layer, a packet data convergence protocol (PDCP) layer, and a service data adaptation protocol (service data adaptation protocol, SDAP) layer.

A resource pool (resource pool, RP) is a group of resources allocated for SL communication. The resource pool consists of a subframe and a resource block in the subframe. For SL communication, two additional physical channels are introduced: a physical sidelink control channel (physical sidelink control channel, PSCCH) carrying control information and a physical sidelink share channel (physical sidelink share channel, PSSCH) carrying data. The resource pool may be defined by a group of parameters in frequency domain and time domain. For example, in the frequency domain, a bandwidth or frequency range may be defined by a parameter such as a quantity of resource blocks, and a bandwidth or frequency location may be defined by a resource block start and/or a resource block end; in the time domain, a subframe used for PSCCH or PSSCH transmission may be defined. Certainly, zone information, subchannel information, resource selection information, and the like may be further included. The network device may send V2X resource pool information to the terminal device by using a system message such as SIB21, to configure a PC5 interface for SL communication. The resource may include a common (common) resource and an exceptional (exceptional) resource. In addition, when the terminal device is in an RRC connected state, the network device may allocate control and data resources for SL communication to the terminal device by using an RRC message. In addition to the common resource and the exceptional resource, the resource herein may further include a dedicated resource.

The SL may be considered as a radio link in the PC5 interface. When an SL radio link failure RLF occurs, the terminal devices fail to communicate with each other properly. Usually, the main cause of the SL RLF occurring on the transmit-end terminal device is a quantity of RLC retransmissions reaching the maximum, and the main causes of the SL RLF occurring on the receive-end terminal device are an integrity protection failure, out-of-synchronization, and the like. In addition, the SL RLF may also occur on the receive-end terminal device due to an access AS stratum configuration failure. The AS stratum may include one or more protocol layers such as a MAC layer, an RLC layer, a PDCP layer, and an RRC layer. It should be noted that, this is merely an example herein. There may be other causes of the SL RLF occurring on the receive-end terminal device and the transmit-end terminal device, and the causes are not limited to the foregoing examples.

If the network device can obtain the SL RLF information of the terminal device, root cause analysis may be performed, and resource configuration of the PC5 interface is optimized based on the analysis result, to reduce subsequent SL RLFs, and improve utilization of the V2X service in a network application. For example, if the network device obtains the SL RLF information and indicates that a failure type is an AS stratum configuration failure, the network device may optimize the AS stratum configuration, to reduce SL RLFs caused by the AS stratum configuration. It should be noted that this is merely an example herein, and this application is not limited thereto.

Figure 6:
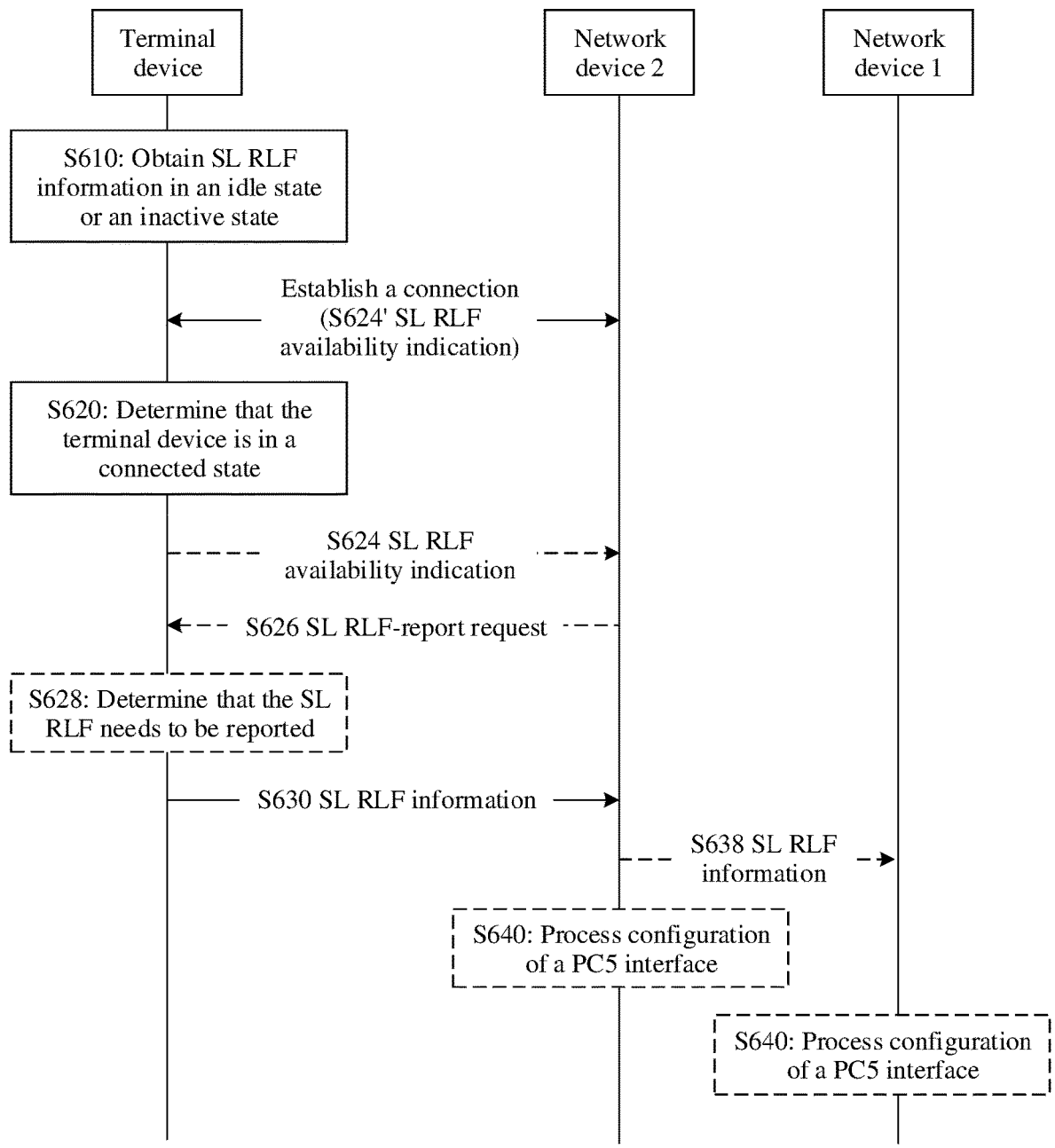
FIG. 6 is a flowchart of a method for processing SL RLF information according to an embodiment of this application.

FIG. 6 is a method for processing radio link failure RLF information according to an embodiment of this application. The method may be used for SL transmission in a V2X system and includes the following steps. It may be understood that for example, although the following steps are performed by a terminal device or a network device, the steps may also be performed by a communication apparatus, a chip, or the like in the corresponding terminal device or network device.

S610: Obtain SL RLF information of the terminal device in an idle state or an inactive state.

The terminal device may perform SL transmission in the idle state or the inactive state. When an RLF occurs on the SL, the terminal device obtains and records the SL RLF information of the SL on which the radio link failure occurs. Because an SL may be established between one terminal device and one or more terminal devices for SL transmission, the SL RLF information obtained and recorded by the terminal device may be SL RLF information of one or more SLs.

The terminal device herein may be a transmit-end terminal device, such as Tx UE, or may be a receive-end terminal device, such as Rx UE.

The SL RLF information may include one or more of the following: cell information of the SL RLF, zone (zone) information of the SL RLF, frequency information of the SL, or resource information of the SL.

The cell information of the SL RLF may be one or more of the following information of a cell where the RLF occurs on the SL: a cell identifier, a physical cell identifier (physical cell identifier, PCI), an NR cell global identifier (NR cell global identifier, NCGI), and the like.

The zone information of the SL RLF may be an identifier of a zone where the RLF occurs on the SL. The zone may be a geographic zone configured by the network device for the terminal device, and may be defined by a geographic location, a length, and a width of a reference point.

The frequency information of the SL may be one or more of the following information of a frequency used by the SL on which the RLF occurs: a frequency band, or a frequency band identifier, a frequency, or a bandwidth part (bandwidth-part, BWP) identifier, or the like.

The resource information of the SL may be information of a resource used by the SL on which the RLF occurs, for example, a resource type, or a frequency domain parameter or a time domain parameter of the resource. The resource may include the following type: an exceptional resource, a common resource, or another dedicated resource. For the terminal device in the idle state, the resource allocated to the SL may be obtained by using a broadcast message of the network device. For the terminal device in the inactive state, the network device may send, to the terminal device, the resource allocated to the SL by using an RRC message. For example, the dedicated resource is indicated to the terminal device that is switched to the inactive state by using an RRC release message. For the terminal device in the connected state, the network device may send, to the terminal device, the resource allocated to the SL by using a broadcast message or an RRC message. The terminal device may correspondingly determine the resource used by the SL. Once an RLF occurs, the terminal device may record information such as a resource type used by the SL, and a frequency domain parameter or a time domain parameter of the resource. It should be noted that, in a possible implementation, the resource information of the SL may include the frequency information of the SL, or may obtain the frequency information of the SL based on the resource information of the SL that is included in the SL RLF information.

The SL RLF information may also include an RLF type, and the RLF type may be used to distinguish whether an RLF is caused by an AS stratum configuration failure. For example, the RLF type may include an SL RLF or an AS stratum configuration failure. If the RLF type is an SL RLF, the SL RLF information may further include an RLF cause, for example, a quantity of RLC retransmissions reaching the maximum, an integrity protection failure, or out-of-synchronization. In a possible implementation, the RLF type may not be distinguished, and the AS stratum configuration failure is also used as the RLF cause. In other words, the SL RLF information includes the RLF cause. The RLF cause includes the AS stratum configuration failure, the quantity of RLC retransmissions reaching the maximum, the integrity protection failure, the out-of-synchronization, and the like.

Optionally, because a channel busy ratio (channel busy ratio, CBR) of the SL may be used by the terminal device to adjust a transmit parameter, for example, a maximum transmit power, a quantity of retransmissions, a quantity of radio bearers (radio bearers, RBs), a modulation and coding scheme (modulation and coding scheme, MCS), or a limitation on a maximum channel occupation rate, the SL RLF information may further include a channel busy ratio (channel busy ratio, CBR) of the SL.

Optionally, the SL RLF information may further include a source identifier (sourceID) and a destination identifier (destinationID), where the source and the destination are respectively a transmit-end terminal device and a receive-end terminal device.

Optionally, the SL RLF information may further include location information of the transmit-end terminal device and/or location information of the receive-end terminal device.

S620: Determine that the terminal device is in a connected state.

In the idle state or the inactive state, the terminal device cannot report the SL RLF information to the network device. After the terminal device is reconnected to the wireless communication network, that is, after the terminal device establishes a connection to the network device, the terminal device is in a connected state. For example, after the terminal device sends an RRC connection completion message to the network device, and establishes a connection to the network device, the terminal device is in a connected state.

S630: The terminal device sends the SL RLF information obtained in S610 to the network device.

After the terminal device establishes a connection to the network device, the terminal device sends the SL RLF information obtained in S610 to the network device. Correspondingly, the network device receives the SL RLF information of the SL on which the RLF occurs when the terminal device is in the idle state or the inactive state.

In the idle state or the inactive state, the terminal device cannot report the SL RLF information to the network device. After the terminal device is reconnected to the wireless communication network, that is, after the terminal device establishes a connection to the network device, the terminal device may send a report message to the network device, where the report message includes the SL RLF information obtained in S610.

It should be noted that, when the terminal device is in the idle state or the inactive state, the terminal device may record the SL RLF information in a log (log) manner. The log may be a log report of current minimization of drive tests (minimization of drive tests, MDTs), or another newly defined report. This is not limited in the present invention.

In a possible design, when a connection between the terminal device and the network device is successfully established, the terminal device may report the SL RLF information recorded in the idle state or the inactive state to the network device. The SL RLF information may be reported by using an existing RRC message, or may be reported by using a newly defined message, for example, may be reported in an RRC connection establishment completion message, or may be reported separately by using a message or in another message sent to the network device after an RRC connection is established.

In another possible design, the network device may configure a report periodicity or a report condition of the SL RLF information for the terminal device. When the report periodicity of the SL RLF information is reached or the report condition of the SL RLF information is met, the terminal device may report the recorded SL RLF information to the network device. The recorded SL RLF information may include the SL RLF information obtained in the idle state or the inactive state in S610. Optionally, before step S630, the method may include:

Step S628: The terminal device determines that the SL RLF information needs to be reported.

In a possible implementation, it may be determined, if a periodic report timer of the SL RLF information expires, that the report periodicity of the SL RLF information is reached. In another possible implementation, it may also be determined, if a parameter related to the SL RLF information report reaches a specific threshold, that the SL RLF information needs to be reported. It may also be determined that, the report condition of the SL RLF information is met to determine that the SL RLF information needs to be reported. Examples are not enumerated one by one herein.

In still another possible design, the network device may request the terminal device to report the SL RLF information, and the terminal device sends the SL RLF information to the network device based on the request of the network device. Optionally, before step S630, the method may further include:

Step S626: The terminal device receives the RLF-report request sent by the network device.

The network device sends the RLF-report request to the terminal device, to request to report the SL RLF information. The RLF-report request may be used to request the terminal device to report the SL RLF information. The RLF-report request may include a type used to indicate the terminal device to report, for example, indicate the terminal device serving as a transmit-end terminal device to report or serving as a receive-end terminal device to report.

Optionally, the RLF-report request may also include the RLF-report periodicity or condition in step S628. Correspondingly, step S628 may be included.

In still another possible implementation, before step S626, optionally, the method may further include:

Step S624: The terminal device sends an SL RLF information availability indication to the network device.

The terminal device may send an SL RLF information availability indication to the network device, and the network device receives the SL RLF information availability indication. The network device may determine, based on the SL RLF information availability indication, whether the SL RLF information is available, to determine whether to request the SL RLF information. For example, if the SL RLF information availability indication sent by the terminal device is "unavailable", the network device does not perform step S626, and does not request the terminal device to report the SL RLF information in the idle state or in the inactive state. For another example, if the SL RLF information availability indication sent by the terminal device is "available", the network device performs step S626, and the terminal device may immediately report, and perform step S630, or may perform step S630 after performing step S628 to determine that a report condition is met or a report periodicity is reached.

The SL RLF information availability indication may be reported by using an RRC message, for example, reported in an existing RRC connection establishment completion message, or the SL RLF information may be reported separately by using a newly defined RRC message or in another RRC message sent to the network device after an RRC connection is established.

Step S640: The network device processes configuration related to the SL based on the SL RLF information received in step S630.

The network device may perform root cause analysis on the received SL RLF information, and optimize the configuration related to the SL, for example, an SL transmission resource and a transmission configuration parameter of a PC5 interface. For example, a resource allocated to the SL or transmission configuration of the PC5 interface is reconfigured. The network device may optimize one or more of the following parameters: a resource in a V2X resource pool in a broadcast message or an RRC message, such as an exceptional resource or a common resource, or PC5 transmission configuration in a broadcast message or an RRC message.

The optimization of the SL transmission resource may include one or more of the following: adding the V2X resource pool, reducing the V2X resource pool, replacing the V2X resource pool, changing a usage state of the V2X resource pool, and the like. The V2X resource pool to be optimized includes one or more of a common (common) resource pool, an exceptional (exceptional) resource pool, and a dedicated (dedicated) resource pool. Specifically, the resource pool includes the following parameters: a zone identifier (zone ID), a sidelink SL subframe (sidelinksubframe), a start radio resource block (start radio resource block), a number of subchannels (number of subchannels), a size of a subchannel (size of subchannel), and the like. These parameters may be adjusted, for example, changing the start radio resource block, increasing or decreasing the number and size of subchannels.

The transmission configuration parameter of the PC5 interface includes bearer configuration of each layer of a control plane or a user plane (for example, configuration of SDAP/PDCP/RLC/MAC/PHY), obtaining of an SL capability of the terminal device, measurement configuration and report of a reference signal received power (Reference Signal Receiving Power, RSRP) of the SL, and the like.

Optionally, because the terminal device may move, the network devices may further exchange the SL RLF information with each other. Before step S640, the method may further include:

Step S638: The network device sends the SL RLF information to a network device corresponding to the network device.

Correspondingly, the network device that processes the configuration related to the SL in step S640 may be a network device that receives the SL RLF information forwarded by another network device.

Because the terminal device moves, a network device on which the terminal device camps or that is connected to the terminal device also changes. The network device may determine, based on an identifier of a cell in which the SL RLF occurs in the SL RLF information, a network device where the network device is located, and send the SL RLF information to the network device, so that the network device may process SL transmission resource configuration and the transmission configuration parameter of the PC5 interface based on the SL RLF information.

Optionally, the SL RLF information may be exchanged between the network devices by using an existing message of an Xn interface, for example, a UE context request/response message or a handover request/response message, or may be exchanged by using a newly defined Xn interface message. This is not limited in the present invention.

For example, the terminal device in an idle state is located in a network device 1, and establishes a connection to a network device 2 after moving to the network device 2. However, an SL RLF occurs on the terminal device in a cell served by the network device 1, and SL RLF information of the terminal device is reported to the network device 2. The network device 2 sends the received SL RLF information to the network device 1.

For another example, when the terminal device is in a connected state, an SL RLF occurs in a cell served by the network device 1, and the terminal device moves from a source network device 1 to a destination network device 2. After receiving the SL RLF information, the destination network device 2 sends the received SL RLF information to the source network device 1.

For another example, when the terminal device is in an inactive state, an SL RLF occurs in a cell served by the network device 1, and the terminal device moves from a source network device 1 to a destination network device 2. After receiving the SL RLF the destination network device 2 sends the received SL RLF information to the source network device 1. In this scenario, the destination network device 2 may send the received SL RLF information to the source network device 1 by using a UE context request message.

For another example, when the terminal device is in a connected state, the terminal device sends the SL RLF information to a source network device 1. The source network device 1 sends the SL RLF information to a neighboring network device. After the neighboring network device receives the SL RLF information, the source network device 1 may be used to assist the neighboring network device in configuring SL transmission resource configuration and a transmission configuration parameter of a PC5 interface for a terminal device under the neighboring network device. It should be noted that, the neighboring network device may be a target network device to which the terminal device is moved, or may be another neighboring network device. This is not limited in this aspect.

In this embodiment of this application, after the terminal device is restored to the connected state, the terminal device may report, to the network device, the SL RLF information that occurs when the terminal device is in an idle state or an inactive state, so that the network device may more comprehensively obtain RLF information of the SL, and a radio link management RLM function of the SL is more complete. Further, the network device may optimize and process SL resource configuration based on the SL RLF information reported by the terminal device, to reduce RLFs, and improve a success rate of SL communication. Further, when the terminal device moves, the network device may also send the SL RLF information to a corresponding network device through interaction between the network devices, so that the SL resource configuration is optimized more accurately.

Figure 7:
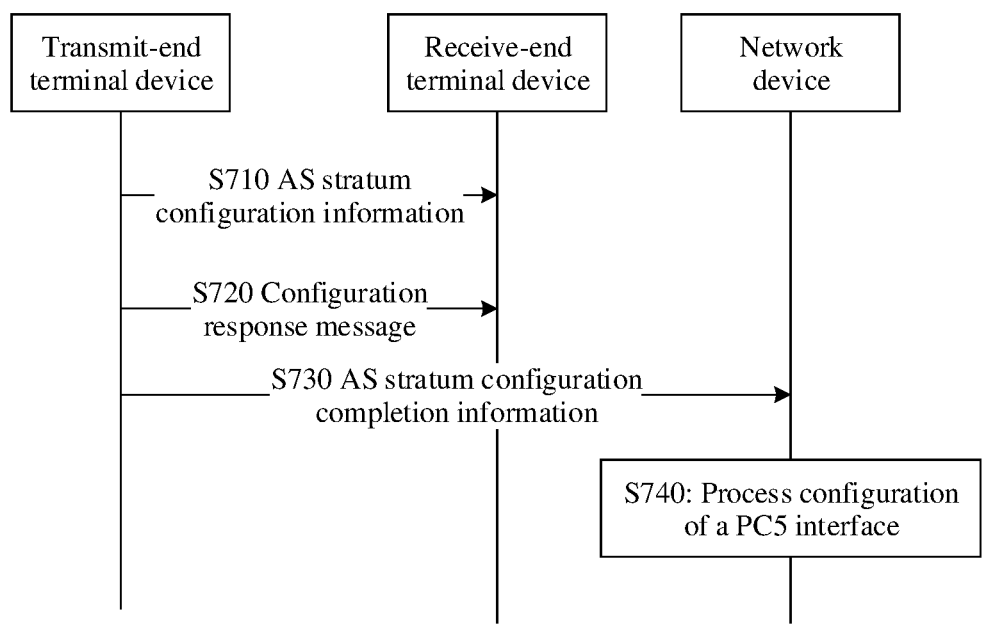
FIG. 7 is a flowchart of a method for processing SL RLF information according to another embodiment of this application.

When the terminal devices are in a connected state, SL communication may also be performed between the terminal devices. A transmit-end terminal device obtains an AS stratum configuration, and sends the AS stratum configuration to a receive-end terminal device, to notify the network device of a configuration result. FIG. 7 is a method for processing RLF information according to another embodiment of this application. The method includes the following steps. It may be understood that for example, although the following steps are performed by a terminal device or a network device, the steps may also be performed by a communication apparatus, a chip, or the like in the corresponding terminal device or network device.

S710: The transmit-end terminal device sends AS stratum configuration information to the receive-end terminal device, to configure an AS stratum of the receive-end terminal device.

To perform SL communication, the transmit-end terminal device sends the AS stratum configuration of the PC5 interface of the receive-end terminal device to the receive-end terminal device.

The AS stratum configuration information may be obtained by the transmit-end terminal device from the network device, or may be generated by the transmit-end terminal device itself, or may be generated by the transmit-end device based on a PC5 interface resource of broadcast configuration or RRC configuration of the network device. This is not limited in this embodiment of this application.

The AS stratum configuration may include unicast connection transmission configuration of the transmit-end terminal device and the receive-end terminal device, or multicast connection transmission configuration of the transmit-end terminal device and the receive-end terminal device.

S720: The receive-end terminal device sends a configuration response message to the transmit-end terminal device.

The receive-end terminal device performs configuration based on the AS stratum configuration information received in S710, and sends a configuration response message to the transmit-end terminal device, to notify the transmit-end terminal device of a configuration result. The configuration result can be successful or failed.

S730: The transmit-end terminal device sends AS stratum configuration completion information to the network device based on the configuration response message received in step S720.

The transmit-end terminal device sends AS stratum configuration completion information to the network device based on the received configuration response message of the receive-end terminal device. The configuration completion information indicates that the AS stratum configuration of the PC5 interface is completed or the AS stratum configuration of the PC5 interface fails.

In a possible implementation, if the AS stratum configuration result is failed, the transmit-end terminal device considers that RRC configuration fails, initiates RRC reestablishment, and adds the configuration completion information (an AS stratum configuration failure of the PC5 interface) to any RRC message and sends the configuration completion information to the network device, for example, adds the configuration completion information to an RRC reestablishment message and sends the configuration completion information to the network device.

In another possible implementation, if the AS stratum configuration result is successful, the transmit-end terminal device may send the AS stratum configuration result to the network device by using any RRC message, for example, by using an RRC connection establishment completion message or an RRC connection reconfiguration completion message.

S740: The network device processes configuration related to the SL based on the AS stratum configuration completion information received in step S730.

The network device may optimize configuration of the PC5 interface based on the received AS stratum configuration completion information. For example, a resource allocated to the SL or transmission is reconfigured. The network device may optimize one or more of the following parameters: a resource in a V2X resource pool in a broadcast message or an RRC message, such as an exceptional resource or a common resource, or PC5 transmission configuration in a broadcast message or an RRC message. Refer to the description in the foregoing step 640.

In this embodiment of this application, the transmit-end terminal device may report, to the network device, information about a configuration result indicating that the receive-end terminal device fails to be configured in a connected state, so that the network device may more comprehensively obtain AS stratum configuration information of the PC5 interface, and a radio link management RLM function of the SL is more complete. In addition, when a failure occurs, the terminal device may trigger RRC reestablishment, to enable the network device to reconfigure the AS stratum of the PC5 interface. Further, the network device may optimize and process resource configuration of the PC5 interface based on the AS stratum configuration completion information reported by the terminal device, to reduce RLFs caused by the resource configuration, and improve a success rate of SL communication.

Figure 8:
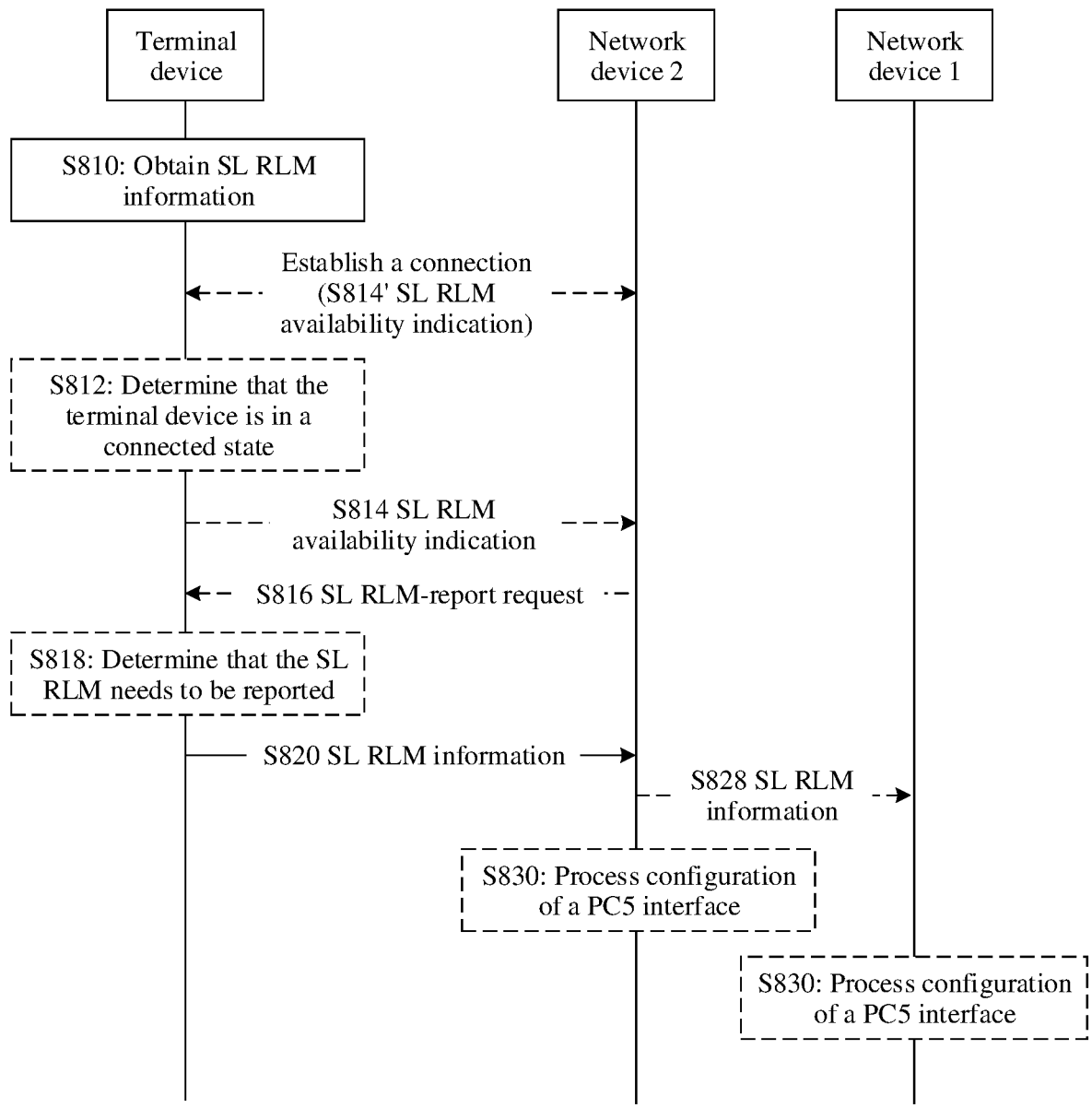
FIG. 8 is a flowchart of a method for processing SL RLM information according to still another embodiment of this application.

SL radio link management RLM may be optimized after an RLF occurs. In addition, the SL RLM may be prevented before the RLF occurs, to reduce the probability of SL RLFs. FIG. 8 is a method for processing RLM information according to another embodiment of this application. The method includes the following steps. It may be understood that for example, although the following steps are performed by a terminal device or a network device, the steps may also be performed by a communication apparatus, a chip, or the like in the corresponding terminal device or network device.

S810: The terminal device obtains SL RLM information of the SL.

After SL communication is established between the terminal devices, the terminal devices may obtain the SL RLM of the SL. The terminal device may establish SL communication in an idle state, an inactive state, or a connected state. Therefore, the SL RLM information may be SL RLM information of the SL established when the terminal device is in the idle state, the inactive state, or the connected state.

It should be noted that, when the terminal device is in the idle state or the inactive state, the terminal device may record the SL RLM information in a log (log) manner. The log may be a log report of current minimization of drive tests (minimization of drive tests, MDTs), or another newly defined report. This is not limited in the present invention.

S820: The terminal device sends the SL RLM information obtained in step S810 to the network device. Because an SL may be established between one terminal device and one or more terminal devices for SL transmission, the SL RLM information obtained and recorded by the terminal device may be SL RLM information of one or more SLs.

The terminal device herein may be a transmit-end terminal device, such as Tx UE, or may be a receive-end terminal device, such as Rx UE.

The SL RLM information may include one or more of the following parameters.

Maximum quantity of consecutively received continuous "out-of-sync" indications. This parameter is also named N310 sometimes, and when the quantity of the continuous "out-of-sync" indications consecutively received by the terminal device reaches the maximum, the terminal device starts a radio link recovery timer.

The radio link recovery timer. The timer may also be named T310, and after the terminal device starts the timer, if the timer does not expire but a radio link is restored, the terminal device stops the timer, or if the timer expires, it is considered that the radio link fails.

Maximum quantity of continuous "in-sync" indications. This parameter may also be named N311, and used to set the maximum quantity of continuous "in-sync" indications that need to be received before the radio link recovery timer is stopped. For example, N311=2 indicates that during running of the T310, if the terminal device consecutively receives two synchronization indications, it may be considered that the radio link is restored, and the T310 is stopped.

Maximum quantity of RLC retransmissions.

Indications of a channel quality synchronization threshold Qin and a channel quality out-of-synchronization threshold Qout.

Measurement reference signal strength RSRP, reference signal quality RSRQ, and signal to interference plus noise ratio of a cell; measurement reference signal strength RSRP, reference signal quality RSRQ, and signal to interference plus noise ratio of an SL.

Optionally, the SL RLM information may further include a source identifier (sourceID) and a destination identifier (destinationID), where the source and the destination are respectively a transmit-end terminal device and a receive-end terminal device.

When the terminal device is in the idle state or the inactive state, the terminal device cannot report the SL RLM information to the network device. After the terminal device is reconnected to the wireless communication network, that is, after the terminal device establishes a connection to the network device, the terminal device is in a connected state. For example, after the terminal device sends an RRC connection completion message to the network device, and establishes a connection to the network device, the terminal device is in a connected state. Optionally, before step S820, the method may include S812: Determine that the terminal device is in the connected state. The terminal device in the connected state may send the SL RLM information to the network device.

In another possible design, the network device may configure a report periodicity of the SL RLM information or an event trigger condition for the terminal device. When the report periodicity of the SL RLM information is reached or the report condition of the SL RLM information is met, the terminal device may report the recorded SL RLM information to the network device. Optionally, before step S820, the method may include:

Step S818: The terminal device determines that the SL RLM information needs to be reported.

In a possible implementation, it may be determined, if a periodic report timer of the SL RLM information expires, that the report periodicity of the SL RLM information is reached. In still another possible implementation, it may also be determined, when a parameter related to SL RLM information report reaches a threshold, that the SL RLM information needs to be reported. It may also be determined that, the report condition of the SL RLM information is met to determine that the SL RLM information needs to be reported. Examples are not enumerated one by one herein.

In still another possible design, the network device may request the terminal device to report the SL RLM information, and the terminal device sends the SL RLM information to the network device based on the request of the network device. Optionally, before step S820, the method may further include:

Step S816: The terminal device receives the RLM-report request sent by the network device.

The network device sends the RLM-report request to the terminal device, to request to report the SL RLM information.

The RLM-report request may be used to request the terminal device to report the SL RLM information. The RLM-report request may include a type used to indicate the terminal device to report, for example, indicate the terminal device serving as a transmit-end terminal device to report or serving as a receive-end terminal device to report.

Optionally, the RLM-report request may also include the RLM-report periodicity or condition in step S818. Correspondingly, step S818 may be included.

In still another possible implementation, before step S816, optionally, the method may further include:

Step S814: The terminal device sends an SL RLM information availability indication to the network device.

The terminal device may send an SL RLM information availability indication to the network device, and the network device receives the SL RLM information availability indication. The network device may determine, based on the SL RLM information availability indication, whether the SL RLM information is available, to determine whether to request the SL RLM information. For example, if the SL RLM information availability indication sent by the terminal device is "unavailable", the network device does not perform step S816, and does not request the terminal device to report the SL RLM information. For another example, if the SL RLM information availability indication sent by the terminal device is "available", the network device performs step S816, and the terminal device may immediately report, and perform step S820, or may perform step S820 after performing step S818 to determine that a report condition is met or a report periodicity is reached.

The SL RLM information availability indication may be reported in an RRC connection establishment completion message, or the SL RLM information may be reported separately by using a newly defined message or in another RRC message sent to the network device after an RRC connection is established.

The terminal device may report the SL RLM to the network device by using an existing RRC message, or may report the SL RLM to the network device by using a newly defined message. For details, refer to the report state of the SL RLF in step S630 or the report state of AS configuration completion in S730. The difference lies in that reported content is the SL RLM.

S830: The network device processes configuration related to the SL based on the SL RLM information.

The network device may analyze the received SL RLM information, and optimize and configure an SL-related resource in a scenario on the verge of an RLF. For example, if it is predicted, based on the SL RLM, that the RLF is to occur on the SL between the terminal devices, more PC5 resources and the like are configured for the SL. For optimization of the configuration related to the SL, refer to corresponding descriptions in S640. Details are not described herein.

Optionally, the network devices may further exchange the SL RLM information with each other. Before step S830, the method may further include:

Step S828: The network device sends the SL RLM information to a network device corresponding to the network device.

Correspondingly, the network device that processes the configuration related to the SL in step S830 may be a network device that receives the SL RLM information forwarded by another network device.

Because the terminal device moves, a network device on which the terminal device camps or that is connected to the terminal device also changes. The network device may determine, based on an identifier of a cell in the SL RLM information, a network device where the network device is located, and send the SL RLM information to the network device, so that the network device may process SL transmission resource configuration and the transmission configuration parameter of the PC5 interface based on the SL RLM information.

Optionally, the SL RLM information may be exchanged between the network devices by using an existing message of an Xn interface, for example, a UE context request/response message or a handover request/response message, or may be exchanged by using a newly defined Xn interface message. This is not limited in the present invention.

For example, the terminal device in an idle state is located in a network device 1, and establishes a connection to a network device 2 after moving to the network device 2. However, the terminal device performs SL communication in a cell served by the network device 1, and SL RLM information of the terminal device is reported to the network device 2. The network device 2 sends the received SL RLM information to the network device 1.

For another example, when the terminal device is in a connected state, a cell served by the network device 1 performs SL communication with another terminal device, and the terminal device moves from a source network device 1 to a destination network device 2. After receiving the SL RLM information, the destination network device 2 sends the received SL RLM information to the source network device 1.

For another example, when the terminal device is in an inactive state, a cell served by the network device 1 performs SL communication, and the terminal device moves from a source network device 1 to a destination network device 2. After receiving the SL RLM the destination network device 2 sends the received SL RLM information to the source network device 1. In this scenario, the destination network device 2 may send the received SL RLM information to the source network device 1 by using a UE context request message.

For another example, when the terminal device is in a connected state, the terminal device sends the SL RLM information to a source network device 1. The source network device 1 sends the SL RLM information to a neighboring network device. After the neighboring network device receives the SL RLM information, the source network device 1 may be used to assist the neighboring network device in configuring SL transmission resource configuration and a transmission configuration parameter of a PC5 interface for a terminal device under the neighboring network device. It should be noted that, the neighboring network device may be a target network device to which the terminal device is moved, or may be another neighboring network device. This is not limited in this aspect.

In this embodiment of this application, the terminal device may report the SL RLM information to the network device, so that the network device may more comprehensively obtain a radio link status and information of the SL, and a radio link management RLM function of the SL is more complete. Further, the network device may optimize and process resource configuration of the SL based on the SL RLM information reported by the terminal device, to reduce RLFs caused by the resource configuration, and improve a success rate of SL communication. Further, when the terminal device moves, the network device may also send the SL RLM information to a corresponding network device through interaction between the network devices, so that the SL resource configuration is optimized more accurately.

It may be understood that in the foregoing embodiments, the methods and/or steps implemented by the terminal device or the network device may alternatively be implemented by a component (for example, a chip or a circuit) that can be used in the terminal device or the network device.

The foregoing mainly describes the solutions provided in embodiments of this application from a perspective of interaction between the network elements. Correspondingly, an embodiment of this application further provides a communication apparatus. The communication apparatus is configured to implement the foregoing methods. The communication apparatus may be the terminal device in the foregoing method embodiments, for example, the transmit-end terminal device or the receive-end terminal device, or an apparatus including the foregoing terminal device, for example, various types of vehicles, or an apparatus included in the foregoing terminal device, for example, a system chip. Alternatively, the communication apparatus may be the network device in the foregoing method embodiments, or an apparatus included in the foregoing network device, for example, a system chip. It may be understood that, to implement the foregoing functions, the communication apparatus includes a corresponding module, unit, or means (means) for implementing the foregoing methods. The module, unit, or means may be implemented by hardware or software, or implemented by hardware executing corresponding software. The hardware or software includes one or more modules or units corresponding to the foregoing functions. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the communication apparatus may be divided into function modules based on the foregoing method embodiments. For example, function modules corresponding to the functions may be obtained through division, or two or more functions may be integrated into one processing module. The integrated module may be implemented in a form of hardware, or may be implemented in a form of a software function module. It should be noted that, in embodiments of this application, division into the modules is an example, and is merely a logical function division. In actual implementation, another division manner may be used.

Figure 9:
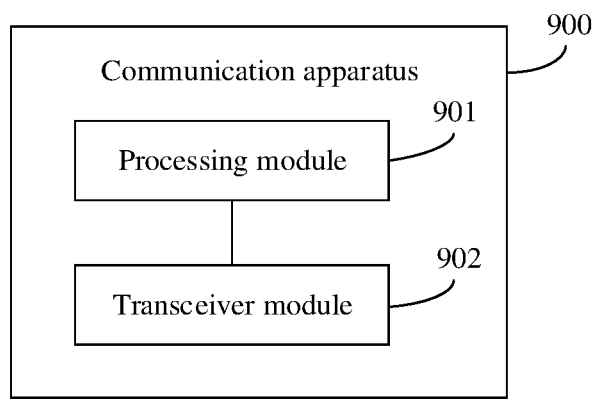
FIG. 9 is a schematic diagram of a structure of a communication apparatus according to an embodiment of this application.

FIG. 9 is a schematic diagram of a structure of a communication apparatus. The communication apparatus includes a processing module 901 and a transceiver module 902. The transceiver module 902 may also be referred to as a transceiver unit, and is used to implement a sending function and/or a receiving function. The transceiver module 902 may be, for example, a transceiver circuit, a transceiver machine, a transceiver, or a communication interface.

In a possible design, the communication apparatus shown in FIG. 9 may be configured to implement a function of the terminal device in the method embodiment corresponding to FIG. 6.

The processing module 901 is used to obtain SL RLF information of the terminal device in an idle state or an inactive state. The processing module 901 is further used to determine that the terminal device is in a connected state, and send SL RLF information of the terminal device in an idle state or an inactive state to a network device by using the transceiver module 902.

Optionally, the processing module 901 is used to determine that the SL RLF information needs to be reported. It may be determined, based on a periodicity or an event report condition, that the SL RLF information needs to be reported.

Optionally, the processing module 901 is used to receive an SL RLF-report request of the network device by using the transceiver module 902. The processing module 901 determines, based on the SL RLF-report request, that the SL RLF information needs to be reported.

Optionally, the processing module 901 is further used to send an SL RLF information availability indication to the network device by using the transceiver module 902. The information availability indication enables the network device to determine whether the SL RLF information is available based on the SL RLF information availability indication, to determine whether to request the SL RLF information.

In another possible design, the communication apparatus shown in FIG. 9 may be configured to implement a function of the network device in the method embodiment corresponding to FIG. 6.

The processing module 901 is used to receive, by using the transceiver module 902, the SL RLF information of the SL of a terminal device on which an RLF occurs when the terminal device is in an idle state or an inactive state. The processing module 901 is further used to process configuration related to the SL based on the SL RLF information.

Optionally, the processing module 901 is used to configure a report periodicity or a report condition of the SL RLF information for the terminal device, or send the RLF-report request to the terminal device by using the transceiver module 902, to request the terminal device to report the SL RLF information.

Optionally, the processing module 901 is used to receive, by using the transceiver module 902, an indication that an SL RLF of the terminal device is available.

Optionally, that the processing module 901 processes the configuration related to the SL based on the SL RLF information includes that the processing module 901 determines a network device corresponding to the SL RLF, and sends, by using the transceiver module 902, the SL RLF information to the network device corresponding to the SL RLF, to enable the network device corresponding to the SL RLF to process the configuration related to the SL.

In still another possible design, the communication apparatus shown in FIG. 9 may be configured to implement a function of a transmit-end terminal device in the method embodiment corresponding to FIG. 7.

The processing module 901 is used to send AS stratum configuration information to a receive-end terminal device by using the transceiver module 902. The configuration information is used to configure an AS stratum of the receive-end terminal device.

The processing module 901 is further used to receive a configuration response message of the receive-end terminal device by using the transceiver module 902. The configuration response message includes an AS stratum configuration failure indication of a PC5 interface or an AS stratum configuration completion indication of a PC5 interface.

The processing module 901 is further used to send AS stratum configuration completion information to the network device based on the configuration response message.

In still another possible design, the communication apparatus shown in FIG. 9 may be configured to implement a function of a receive-end network device in the method embodiment corresponding to FIG. 7.

The processing module 901 is used to receive, by using the transceiver module 902, AS stratum configuration information sent by the transmit-end terminal device.

The processing module 901 is further used to configure an AS stratum of the receive-end terminal device based on the AS stratum configuration information.

The processing module 901 is further used to send a configuration response message to the transmit-end terminal device by using the transceiver module 902, and notify the transmit-end terminal device of a configuration result.

In still another possible design, the communication apparatus shown in FIG. 9 may be configured to implement a function of the network device in the method embodiment corresponding to FIG. 7.

The processing module 901 is used to receive, by using the transceiver module 902, AS stratum configuration completion information sent by the terminal device.

The processing module 901 is further used to process configuration related to the SL based on the received AS stratum configuration completion information.

In still another possible design, the communication apparatus shown in FIG. 9 may be configured to implement a function of the terminal device in the method embodiment corresponding to FIG. 8.

The processing module 901 is used to obtain SL RLM information of the SL.

The processing module 901 is further used to send the SL RLM information to the network device by using the transceiver module 902.

Optionally, before sending the SL RLM information to the network device by using the transceiver module 902, the processing module 901 is further used to determine that the terminal device is in a connected state.

Optionally, the processing module 901 is used to determine that the SL RLM information needs to be reported. It may be determined, based on a periodicity or an event report condition, that the SL RLM information needs to be reported.

Optionally, the processing module 901 is used to receive an SL RLM-report request of the network device by using the transceiver module 902. The processing module 901 determines, based on the SL RLM-report request, that the SL RLM information needs to be reported.

Optionally, the processing module 901 is further used to send an SL RLM information availability indication to the network device by using the transceiver module 902. The information availability indication enables the network device to determine whether the SL RLM information is available based on the SL RLM information availability indication, to determine whether to request the SL RLM information.

In still another possible design, the communication apparatus shown in FIG. 9 may be configured to implement a function of the network device in the method embodiment corresponding to FIG. 8.

The processing module 901 is used to receive, by using the transceiver module 902, the SL RLM information of the terminal device. The processing module 901 is further used to process configuration related to the SL based on the SL RLM information.

Optionally, the processing module 901 is used to configure a report periodicity or a report condition of the SL RLM information for the terminal device, or send the RLM-report request to the terminal device by using the transceiver module 902, to request the terminal device to report the SL RLM information.

Optionally, the processing module 901 is used to receive, by using the transceiver module 902, an indication that an SL RLM of the terminal device is available.

Optionally, that the processing module 901 processes the configuration related to the SL based on the SL RLM information includes that the processing module 901 determines a network device corresponding to the SL RLM, and sends, by using the transceiver module 902, the SL RLM information to the network device corresponding to the SL RLM, to enable the network device corresponding to the SL RLM to process the configuration related to the SL.

In the embodiments of this application, that the processing module 901 is configured to receive or send the foregoing information or message by using the transceiver module 902 may be understood as that after receiving a signal that is sent from the outside and that carries the foregoing information or message, the transceiver module 902 sends the signal to the processing module 901 for processing through signal processing or without signal processing. Alternatively, in the embodiments of this application, that the processing module 901 is configured to receive the foregoing information or message by using the transceiver module 902 may be understood as that after receiving a signal that is sent from the outside and that carries the foregoing information or message, the transceiver module 902 sends the signal to the processing module 901 for processing through signal processing or without signal processing. Descriptions are uniformly provided herein, and details are not described below again.

All related content of the steps in the foregoing method embodiments may be cited in function descriptions of a corresponding function module. Details are not described herein again.

In this embodiment, the terminal device 900 is presented in a form of function modules obtained through division in an integrated manner. The "module" herein may be a specific ASIC, a circuit, a processor that executes one or more software or firmware programs, a memory, an integrated logic circuit, and/or another device that can provide the foregoing function. In a simple embodiment, a person skilled in the art may figure out that the terminal device 900 may be in a form of the communication apparatus 40 shown in FIG. 4.

For example, the processor 401 in the communication apparatus 40 shown in FIG. 4 may invoke the computer-executable instructions stored in the memory 403, to enable the communication apparatus 40 to perform the method for processing the SL RLF or SL RLM information in the foregoing method embodiments.

For example, functions/implementation processes of the processing module 901 and the transceiver module 902 in FIG. 9 may be implemented by invoking, by the processor 401 in the communication apparatus 40 shown in FIG. 4, the computer-executable instructions stored in the memory 403. Alternatively, functions/implementation processes of the processing module 901 in FIG. 9 may be implemented by invoking, by the processor 401 in the communication apparatus 40 shown in FIG. 4, the computer-executable instructions stored in the memory 403, and functions/implementation processes of the transceiver module 902 in FIG. 9 may be implemented by the communication interface 404 in the communication apparatus 40 shown in FIG. 4.

The communication apparatus provided in this embodiment may perform the foregoing method for processing the SL RLF or SL RLM information. Therefore, for technical effects that can be achieved by the communication apparatus, refer to the foregoing method embodiments. Details are not described herein again.

An embodiment of this application further provides a computer-readable storage medium. The computer-readable storage medium stores instructions. When the instructions are run on the communication apparatus, the communication apparatus is enabled to perform the method according to any one of the foregoing aspects.

An embodiment of this application further provides a computer program product including instructions. When the instructions are run on the communication apparatus, the communication apparatus is enabled to perform the method according to any one of the foregoing aspects.

An embodiment of this application further provides a communication apparatus (for example, the communication apparatus may be a chip or a chip system). The communication apparatus includes a processor, configured to implement the method in any one of the foregoing method embodiments. In a possible design, the communication apparatus further includes a memory. The memory is configured to store necessary program instructions and data. The processor may invoke program code stored in the memory to indicate the communication apparatus to perform the method in any one of the foregoing method embodiments. Certainly, the memory may not be in the communication apparatus. When the communication apparatus is a chip system, the communication apparatus may include a chip, or may include a chip and another discrete component. This is not specifically limited in this embodiment of this application.

In the foregoing embodiment, it may be understood that the communication apparatus does not necessarily include a memory, and the communication apparatus may perform a corresponding function by invoking instructions in an external memory. Alternatively, corresponding program instructions may be loaded into a memory in the communication apparatus later, so that the processor performs a corresponding operation after invoking the program instructions.

All or some of the foregoing embodiments may be implemented by using software, hardware, firmware, or any combination thereof. When a software program is used to implement the embodiments, all or a part of the embodiments may be implemented in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by the computer, or a data storage device, such as a server or a data center that integrates one or more usable media. The usable medium may be a magnetic medium (for example, a floppy disk, a hard disk, or a magnetic tape), an optical medium (for example, a DVD), a semiconductor medium (for example, a solid state disk (solid state disk, SSD)), or the like. In this embodiment of this application, the computer may include the apparatuses described above.

Although this application is described with reference to the embodiments, in a process of implementing this application that claims protection, a person skilled in the art may understand and implement other variations of the disclosed embodiments by viewing the accompanying drawings, disclosed content, and appended claims. In the claims, the term "comprise" (comprising) does not exclude another component or another step, and "a" or "one" does not exclude a case of plurality. A single processor or another unit may implement several functions enumerated in the claims. Some measures are recorded in dependent claims that are different from each other, but this does not indicate that these measures cannot be combined to produce a better effect.

Although this application is described with reference to specific features and embodiments thereof, it is clear that various modifications and combinations may be made to them without departing from the spirit and scope of this application. Correspondingly, the specification and accompanying drawings are merely example descriptions of this application defined by the appended claims, and are considered as any of or all modifications, variations, combinations or equivalents that cover the scope of this application. Obviously, a person skilled in the art can make various modifications and variations to this application without departing from the spirit and scope of this application. This application is intended to cover these modifications and variations of this application provided that they fall within the scope of protection defined by the following claims and their equivalent technologies.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for processing radio link failure (RLF) information, wherein the method comprises:
obtaining sidelink (SL) RLF information of a SL on which an RLF occurs and a terminal device is in an idle state or an inactive state;
determining that the terminal device is in a connected state; and
sending the SL RLF information to a network device, wherein before the sending the SL RLF information to the network device, the method further comprises:
determining that a periodic report timer of the SL RLF information expires.

2. The method according to claim 1, wherein the SL RLF information comprises one or more of:
zone information of the SL RLF,
frequency information of the SL, or
resource information of the SL.

3. The method according to claim 2, wherein the resource information comprises one or more of:
an exceptional resource,
a common resource, or
a dedicated resource.

4. The method according to claim 1, wherein
the SL RLF information comprises a RLF type, and
the RLF type comprises one or more of:
the SL RLF, or
an access stratum (AS) configuration failure.

5. The method according to claim 4, wherein in response to the RLF type being the SL RLF, the SL RLF information further comprises an RLF cause value, and the RLF cause value comprises one or more of:
a quantity of radio link control (RLC) retransmissions reaching a maximum value for retransmissions,
an integrity protection failure, or
the terminal device is out-of-synchronization with another terminal device or the network device.

6. The method according to claim 1, wherein the SL RLF information comprises channel busy ratio information of the SL.

7. The method according to claim 1, wherein the SL RLF information comprises a source terminal device identifier and a destination terminal device identifier.

8. The method according to claim 1, wherein the SL RLF information comprises one or more of:
location information of a receive-end terminal device, or
location information of a transmit-end terminal device.

9. The method according to claim 1, wherein before the sending the SL RLF information to the network device, the method further comprises:
reporting, to the network device, an indication that the SL RLF is available.

10. The method according to claim 1, wherein the sending the SL RLF information to the network device is sent as part of a report message, wherein the report message comprises the SL RLF information, and the report message further comprises a terminal device type, and the terminal device type comprises a transmit-end terminal device or a receive-end terminal device.

11. A method for processing radio link failure (RLF) information, wherein the method comprises:
receiving sidelink (SL) RLF information of a SL of a terminal device on which an RLF occurs in response to the terminal device being in an idle state or an inactive state; and
processing configuration information related to the SL based on the SL RLF information, wherein before the receiving the SL RLF information of the terminal device, the method further comprises:
determining that a periodic report timer of the SL RLF information expires.

12. The method according to claim 11, wherein before the receiving the SL RLF information of the terminal device, the method further comprises:
configuring a report periodicity of the SL RLF information for the terminal device or a report condition of the SL RLF information for the terminal device.

13. The method according to claim 12, wherein the method further comprises:
receiving an indication that the SL RLF of the terminal device is available.

14. The method according to claim 11, wherein the processing configuration information related to the SL based on the SL RLF information comprises:
determining a network device corresponding to the SL RLF; and
sending the SL RLF information to the network device, wherein the network device is configured to be enabled by the SL RLF information to process the configuration information related to the SL.

15. A communication apparatus, comprising:
one or more processors; and
one or more non-transitory memories coupled to the one or more processors, and configured to store non-transitory instructions, and in response to being executed by the one or more processors, the non-transitory instructions cause the one or more processors to perform operations comprising:
obtaining sidelink (SL) RLF information of a SL on which an RLF occurs and the apparatus is in an idle state or an inactive state;
determining that the apparatus is in a connected state; and
sending the SL RLF information to a network device, wherein before the sending the SL RLF information to the network device, the operations further comprise:
determining that a periodic report timer of the SL RLF information expires.

16. The apparatus according to claim 15, wherein the SL RLF information comprises one or more of:
cell information of a SL RLF,
zone information of the SL RLF,
frequency information of the SL, or
resource information of the SL.

17. The method according to claim 16, wherein
the resource information comprises one or more of:
an exceptional resource,
a common resource, or
a dedicated resource.

18. The apparatus according to claim 15, wherein
the SL RLF information comprises a RLF type, and
the RLF type comprises one or more of:
the SL RLF, or
an access stratum (AS) configuration failure.

19. The apparatus according to claim 18, wherein in response to the RLF type being the SL RLF, the SL RLF information further comprises an RLF cause value, and the RLF cause value comprises one or more of:
a quantity of radio link control (RLC) retransmissions reaching a maximum value for retransmissions,
an integrity protection failure, or
the terminal device is out-of-synchronization with another terminal device or the network device.

20. The method according to claim 2, wherein the SL RLF information further comprises one or more of:
cell information of a SL RLF.

* * * * *